Patented Feb. 28, 1939

2,148,621

UNITED STATES PATENT OFFICE 2,148,621

GLASS COMPOSITION

Harrison P. Hood, Corning, N. Y., assignor to Corning Glass Works, Corning, N. Y., a corporation of New York No Drawing. Application September 9, 1937, Serial No. 163,158

3 Claims. (Cl. 106—36.1)

This invention relates to glass compositions and has for its primary object a glass composition which is free from alkali and boric oxide and which has a low coefficient of expansion and other desirable properties making it useful for a variety of purposes, such as sealing to tungsten and molybdenum or their alloys.

To these and other ends the invention consists in a glass composition consisting of silica, alumina, lead oxide and magnesia.

I have found that the above constituents when combined in suitable proportions will produce a glass having a very low coefficient of expansion and having a good chemical stability and high electrical resistance.

The following batch which I have melted successfully is illustrative of my invention:

| | |
|---|---|
| Sand | 55 |
| Hydrated alumina | 22.5 |
| Litharge | 12 |
| Red lead | 3 |
| Magnesia | 15 |
| Arsenic | .5 |

The glass resulting from melting the above batch would have the following composition as calculated from the batch:

| | |
|---|---|
| $SiO_2$ | 55 |
| $Al_2O_3$ | 15 |
| PbO | 15 |
| MgO | 15 |

The above glass has an expansion coefficient of $.0_535$ and seals readily to tungsten or molybdenum. It does not blacken when heated in the flame as do most lead containing glasses.

The amounts of the various constituents may vary somewhat and the glass will still largely retain its valuable properties. For example, the silica content preferably should be above 50% in order to retain high stability but if the silica is increased above 60% the glass becomes difficult to melt. The other constituents, alumina, lead oxide and magnesia, may vary individually as much as 5%, but I have found that particularly good results are obtained when these are combined in equal proportions.

I claim:

1. A glass consisting of 50%–60% $SiO_2$, 10%–20% $Al_2O_3$, 10%–20% PbO, and 10%–20% MgO.
2. A glass containing at least 50% silica and equal parts of alumina, lead oxide and magnesia.
3. A glass consisting substantially of 55% $SiO_2$, 15% $Al_2O_3$, 15% PbO, and 15% MgO.

HARRISON P. HOOD.